(12) United States Patent
Duggal et al.

(10) Patent No.: US 12,541,370 B1
(45) Date of Patent: Feb. 3, 2026

(54) REGISTER RENAME FOR DETERMINISTICALLY UPDATED REGISTER

(71) Applicant: Apple Inc., Cupertino, CA (US)

(72) Inventors: Deepankar Duggal, Sunnyvale, CA (US); Richard F. Russo, San Jose, CA (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 18/515,206

(22) Filed: Nov. 20, 2023

Related U.S. Application Data

(60) Provisional application No. 63/584,088, filed on Sep. 20, 2023.

(51) Int. Cl.
  *G06F 9/38* (2018.01)
  *G06F 9/30* (2018.01)

(52) U.S. Cl.
  CPC .......... *G06F 9/384* (2013.01); *G06F 9/30098* (2013.01)

(58) Field of Classification Search
  CPC ...................................................... G06F 9/384
  See application file for complete search history.

(56) References Cited

U.S. PATENT DOCUMENTS

| | | | |
|---|---|---|---|
| 9,170,818 B2 | 10/2015 | Tran | |
| 2004/0015904 A1 | 1/2004 | Jourdan et al. | |
| 2016/0335088 A1* | 11/2016 | Scalabrino | G06F 9/384 |
| 2022/0237123 A1 | 7/2022 | Brandt et al. | |
| 2022/0253316 A1 | 8/2022 | Smith | |
| 2023/0068637 A1* | 3/2023 | Feiste | G06F 9/3012 |
| 2023/0315536 A1* | 10/2023 | Wyse | G06F 9/5077 718/104 |

* cited by examiner

*Primary Examiner* — Michael J Metzger
(74) *Attorney, Agent, or Firm* — Kowert, Hood, Munyon, Rankin & Goetzel, P.C.; Dean M. Munyon

(57) ABSTRACT

Register renaming for a deterministically updated register is disclosed. A processor circuit is configured to operate according to an instruction set architecture that defines a plurality of architectural registers. A register file circuit includes a plurality of physical registers having a first subset dedicated for use in renaming a particular architectural register. A first counter value increments in response to execution of an instruction that updates the particular architectural register. A second counter value increments in response to retirement of a previously executed instruction that updated the particular architectural register. The counter values identify respective physical registers. A mapper circuit is configured to determine, in response to an indication that an instruction that updates the particular architectural register, if a physical register is available based on the count values. The physical register to be mapped to the architectural register is selected based on the count value of the first counter.

20 Claims, 9 Drawing Sheets

REGISTER RENAME FOR DETERMINISTICALLY UPDATED REGISTER

PRIORITY CLAIM

The present application claims priority to U.S. Provisional App. No. 63/584,088 entitled "Register Rename for Deterministically Updated Register," filed Sep. 20, 2023, the disclosure of which is incorporated by reference herein in its entirety.

BACKGROUND

Technical Field

This disclosure is directed to processors, and more particularly, to the management of physical registers in processors that utilize register renaming.

Description of the Related Art

Register renaming is a technique employed in modern processors to enhance instruction-level parallelism and mitigate data hazards. In traditional processor designs, registers act as temporary storage for operands during computation. However, when multiple instructions require the same register concurrent with one another, conflicts may arise leading to stalls and decreased performance. Register renaming may resolve this issue by assigning each instruction a temporary physical register that is mapped to an architectural register. This may in turn eliminate stalls that arise due to register conflicts, and thus allow multiple instructions utilizing a common architectural register to be concurrently in flight. The processor's renaming logic keeps track of the mapping between logical registers (visible to the programmer) and physical registers (used internally by the processor), ensuring correct data flow and enabling instructions to execute in parallel without interference. By enabling efficient handling of register dependencies, register renaming may increase the performance and throughput of modern processors.

SUMMARY

The present disclosure is directed to register renaming for a deterministically updated register. In one embodiment, a processor circuit is configured to operate according to an instruction set architecture that defines a plurality of architectural registers. A register file circuit includes a plurality of physical registers including a first subset dedicated for use in mapping to a particular architectural register. A first counter is configured to update, in response to execution of an instruction that updates the particular architectural register, a first count value identifying one of the first subset of physical registers. A second counter is configured to update, in response to retirement of a previously executed instruction that updated the particular architectural register, a second count value identifying another one of the subset of physical registers. A mapper circuit is configured to receive an indication that an instruction that updates the particular architectural register is to be executed and make a determination, based on the respective count values of the first and second counters, that at least one physical register of the first subset is available for use. In response to the determination, the mapper is configured to select, based on the value of the first counter a particular one of the first subset of physical registers to be mapped to the particular architectural register.

BRIEF DESCRIPTION OF THE DRAWINGS

The following detailed description makes reference to the accompanying drawings, which are now briefly described.

DETAILED DESCRIPTION OF EMBODIMENTS

Figure 1:
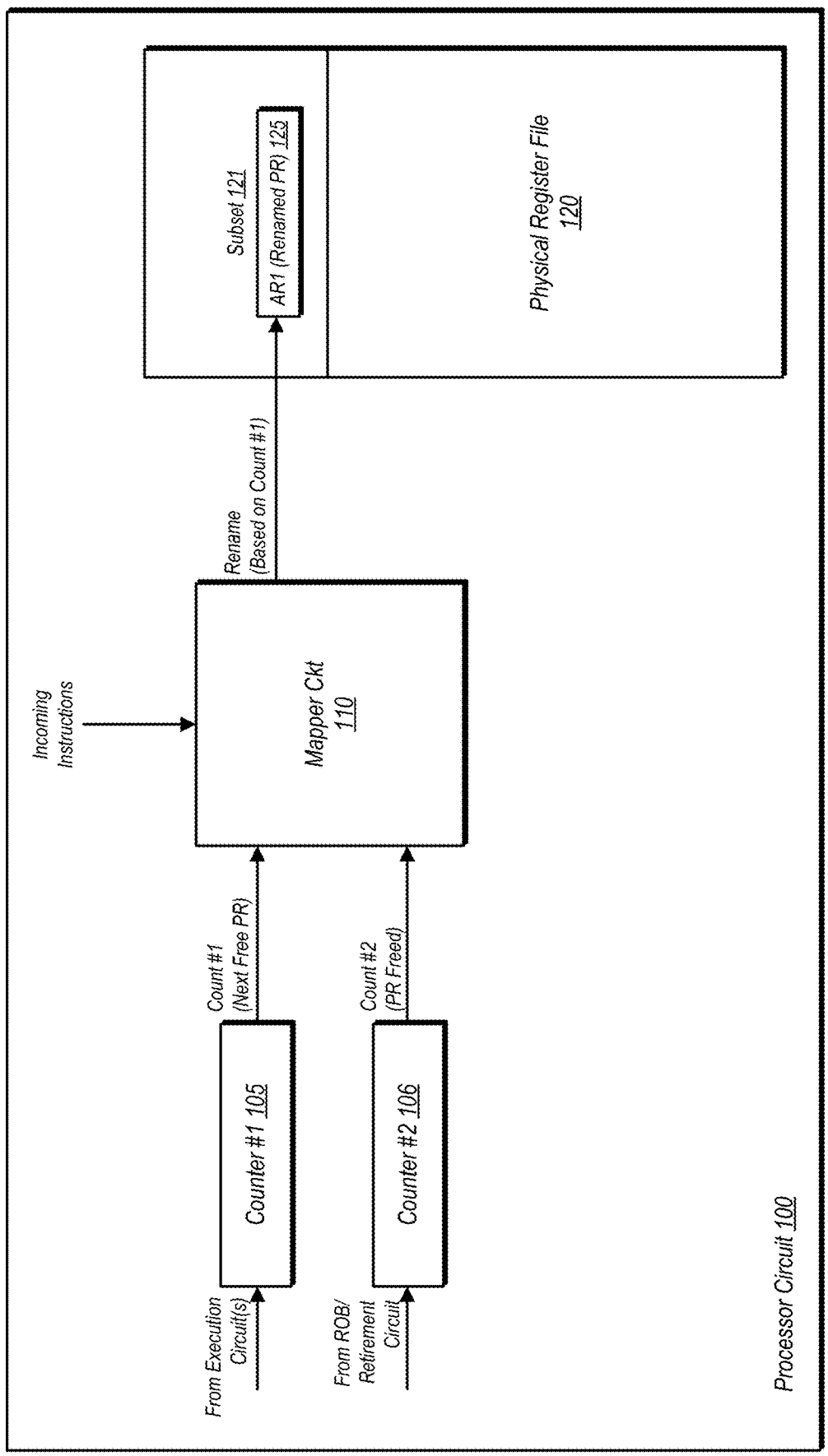
FIG. 1 is a block diagram of one embodiment of a processor.

In processors that utilize register renaming, a mapper circuit is used to rename physical register as architectural registers (sometimes referred to as mapping a physical register to a particular architectural register). A free list is used to indicate which physical registers are available for renaming. A history file is used to store mappings between architectural registers and earlier assigned physical registers which were replaced by new ones upon new mappings. To assign a physical register to an architectural register, a picker in the mapper circuit must search through the free list. The names of physical registers may be returned to the free list upon retirement of an associated instruction or upon a rewind. The returning of most physical registers to the free list is not always deterministic or in a particular order.

Some architectural registers, such as a status register (which stores status flags) may have a group of physical registers reserved thereto. The mapping of physical registers to such an architectural register may be performed deterministically and monotonically. That is, when a new physical register is needed for mapping, it is the next available physical register in the group. Similarly, an oldest mapped physical register in the group of reserved physical registers will be the next register returned to the free list.

Using this insight, the present disclosure utilizes counters for mapping physical registers to correspondingly reserved architectural registers. A first counter is used to indicate a next available physical register that can be mapped to (renamed as) the particular architectural register. When a new physical register is mapped to the particular architectural register, the first counter is incremented. A second counter is incremented upon retirement of an instruction that updates the architectural register to which a corresponding physical register has been mapped. When the second counter is incremented, a physical register corresponding to the most recent count value is thus made available again for mapping to the architectural register. Thus, using the respective count values of the first and second counters, a picture of which physical registers are free and which are in use can be quickly ascertained. During a rewind (e.g., due to a branch mis-prediction) the first counter is decremented, although the second counter is not decremented.

Using the register renaming technique as described herein, some functions of a mapper circuit are eliminated with respect to the particular architectural register. In particular, the mapper circuit does not need to search a free list to find a free physical register that can be mapped to the particular architectural register, but instead, can simply carry out the mapping in accordance with the count value of the first counter. Furthermore, for the particular architectural register, the use of a history file circuit is not necessary. Thus, with respect to the particular architectural register, interactions between a mapper circuit and both a free list circuit and a history file circuit are eliminated. This may also allow the elimination of some storage elements of both the free list circuit and the history file circuit, resulting in power savings. Since there is no interaction with a history file for the particular architectural register, rewinds may be accomplished faster by simply decrementing the first counter.

Another benefit of the register renaming technique described herein is that it may prevent allocating the physical register mappings for the given architectural register into the history file. This in turn can result in the use of less storage for the history file, with a corresponding reduction in power usage.

While the present disclosure utilizes the status register as the architectural register in various examples, these examples are not intended to be limiting. The disclosure contemplates using the renaming technique discussed herein for other registers that may be renamed in a monotonic and deterministic manner. For example, the techniques discussed herein may be applied to a subset of architectural registers, such as those that are most frequently renamed, with the remainder of the architectural registers using the traditional method. This may in turn further simplify operation of the process as well as enabling further reductions in history file storage needed and power consumption associated with accessing the same.

The present disclosure further contemplates usage of the register renaming techniques discussed herein with techniques that enable early physical register release. For example, an architectural register that is a destination for a first instruction and a source and destination for a second instruction may have respective first and second different physical registers mapped thereto. When the second instruction is executed, the first physical register may be released even though the second instruction has not been retired.

It is noted that the use of the terms "map" and "mapping," as used herein are, within this disclosure, interchangeable with the term "renaming" with respect to physical registers. Thus, the act of mapping a particular architectural register to a particular physical register can alternatively be referred to as renaming the particular physical register as the architectural register. Similarly, "mapping a physical register to an architectural register" may be interpreted the same as "renaming the physical register as the architectural register." Furthermore, "assigning" a physical register to an architectural register may be interpreted the same as "mapping" the physical register to the architectural register or "renaming" the physical register as the architectural register. It may further be said that an architectural register may be mapped to a physical register, and that renaming comprises mapping an architectural register to a physical register.

Figure 2:
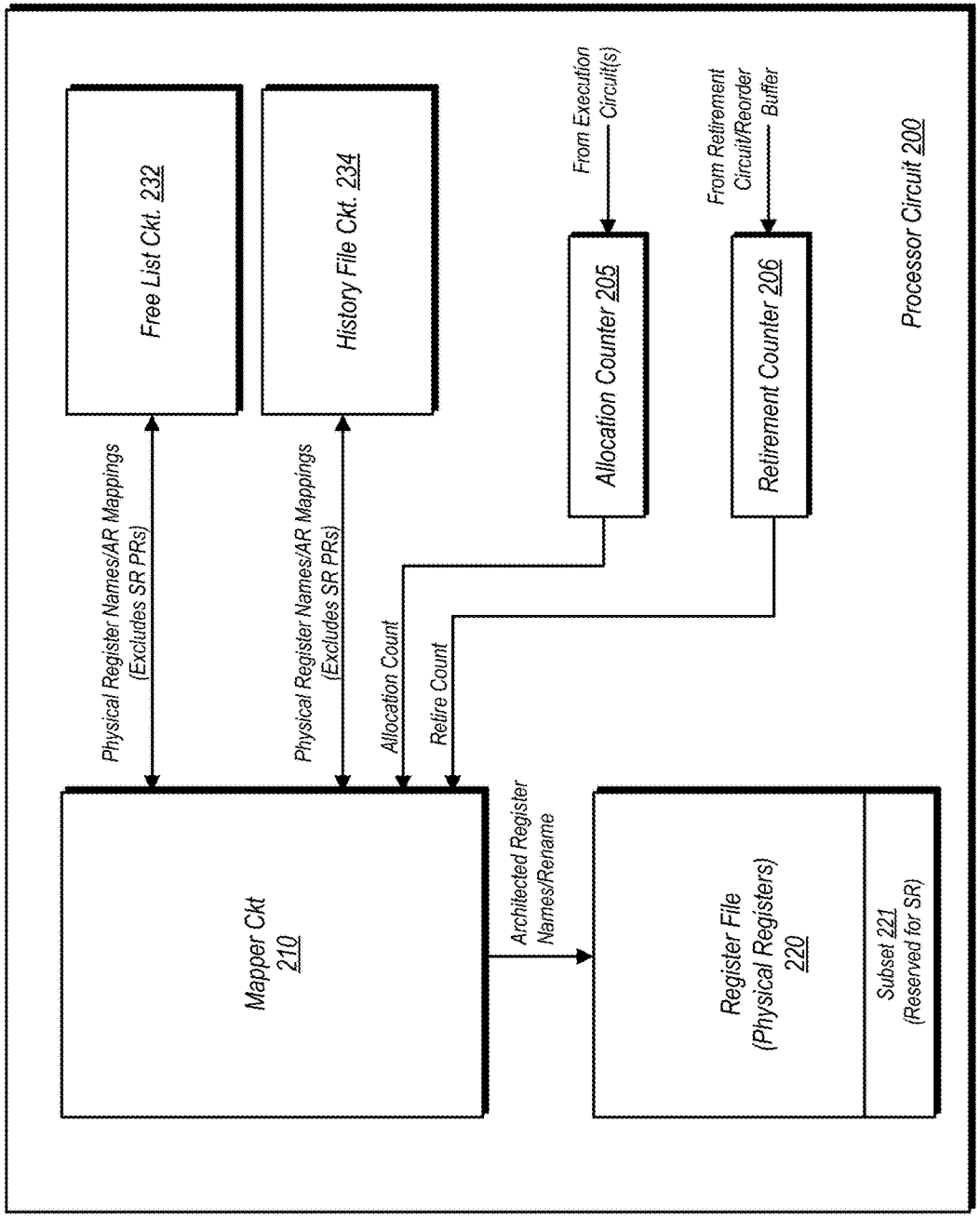
FIG. 2 is a block diagram of another embodiment of a processor.

The present disclosure is now discussed in further detail, beginning with FIGS. 1 and 2, which are example embodiments of a processing circuit according to the present disclosure. A mechanism for mapping physical registers to an architectural register using counters is then discussed in reference to FIG. 3. Methods of operation a processor according to the disclosure are discussed in reference to FIGS. 4 and 5. Another embodiment of a processor circuit is discussed with reference to FIG. 6. An example device that may include a processor circuit according to the disclosure is discussed with reference to FIG. 7. Example applications that may utilize a processor circuit of the present disclosure are discussed with reference to FIG. 8. A discussion of a computer readable medium that stores instructions and/or other information usable to manufacture a circuit in accordance with this disclosure is discussed in reference to FIG. 9.

Processor Circuits Using Counters for Mapping Physical Registers to Architectural Registers:

FIG. 1 is a block diagram of one embodiment of a processor circuit in which counters are used for mapping physical registers to a particular architectural register. The particular architectural register may be one of a plurality of architectural registers that is defined by an instruction set architecture under which processor 100 operates. In the embodiment shown, processor circuit 100 includes counters 105 and 106 (counter #1 and counter #2, respectively), a mapper circuit 110, and a physical register file 120. Physical register file 120 includes a subset of registers 121 that are reserved for renaming as (mapping to) a particular architectural register, AR1. In this example, physical register 125 is shown as mapped to AR1. It is noted that, at any given time, multiple ones of the physical registers of subset 121 may be concurrently mapped to AR1, with each of the physical registers associated with a different instruction that utilizes AR1 as a source or destination. Physical registers not in subset 121 may be mapped to other architectural registers during operation of processor circuit 100.

Counters 105 and 106 in the embodiment shown are configured to keep track of which physical registers of subset 121 have been mapped to the architectural register AR1, and which are free. Counter 105 in the embodiment shown is configured to increment each time an instruction executes that updates the results stored in AR1. The output of counter 105, Count #1, indicates the next free physical register of subset 121 that may be renamed/mapped to AR1. Counter 106 is configured to increment each time an instruction that previously updated AR1 is retired. The output of counter 106, Count #2, is indicative of the next physical register of subset 121 that will be retired.

Taken together, Count #1 and Count #2 provide mapper circuit 110 with a snapshot of which physical registers of subset 121 are currently in use and which are currently free. The ability to carry out register renaming in the manner described herein is enabled by the fact that architectural register AR1 is a single register that is updated monotonically and deterministically. In one embodiment, AR1 is a status register configured to store flag bits, and is thus updated monotonically and deterministically in a particular code sequence. However, the mechanism for mapping physical registers to architectural registers as described herein is not restricted to use with a status register, and may thus be used with other architectural registers having similar characteristics in the manner in which they are updated.

Mapper circuit 110 in the embodiment shown is coupled to receive both Count #1 and Count #2, and may carry out the actual mapping of physical registers in subset 121 to AR1, using the count values from counters 105 and 106. Mapper circuit 110 is also configured to receive information regarding instructions that are to be executed by processor circuit 100 (e.g., by one or more execution units, not shown in this example but discussed in others below), including instructions having AR1 as a destination architectural register. When mapper circuit 110 receives an indication of the imminent execution of an instruction that is to update architectural register AR1, it may determine, based on the values of Count #1 and Count #2, if a physical register in subset 121 is free to be mapped to AR1. In some instances, based on the count values, it is possible that no physical register of subset 121 is free, causing a stall condition (which will be discussed in further detail below).

FIG. 2 is a block diagram of another embodiment of a processor circuit. In the embodiment shown, processor circuit 200 includes allocation counter 205, a retirement counter 206, a mapper circuit 210, a register file 220 (including a subset 221), a free list circuit 232, and a history file circuit 234.

In the embodiment shown, subset 221 of physical register file 220 is reserved exclusively for mapping physical registers to an architectural status register that stores flag bits. The remaining registers of register file 220 in the embodiment shown are available for use by other architectural registers. The full set of architectural registers is defined by an instruction set architecture, under which processor circuit 200 operates.

For the architectural registers other than the status register in this particular embodiments, the mappings of physical registers thereto may be carried out in through the operation of mapper circuit 210, free list circuit 232, and history file circuit 234. Free list circuit 232 is configured to store a listing of those physical registers in register file 220 (excluding those in subset 221) that are currently free for mapping to one of the architectural registers defined by the instruction set architecture, excluding the one to which physical registers of subset 221 are dedicated. In some embodiments, free list circuit 232 may comprise a multi-banked storage structure for storing the list of available physical registers.

When a particular architectural register is to be assigned as a source or a destination for a given instruction to be executed, mapper circuit 210 may search free list circuit 232 to determine which physical registers of register file 220 (excluding those in subset 221) are available to be mapped to architectural registers. Prior to execution of the instruction, mapper 210 may select one of the available physical registers from free list circuit 220 and map it to the architectural register for that particular instruction. Thus, when the particular instruction is executed, the assigned physical register is accessed, either as a source register or a destination, or in some instances, both. From a software point of view, the physical register is seen as the architectural register due to the mapping. When a physical register is no longer in use as an architectural register, its listing may be returned to the free list indicating that it is free to be mapped to an architectural register for another instruction.

History file circuit 234 may store a history of mappings between architectural registers and physical registers, including instructions that have been executed. In some instances, such as when dependencies exist, history file circuit may store the history of particular mappings between architectural and physical registers until the dependent instructions have been retired. The use of the history stored in history file circuit 234 may enable a rewind in program execution in the case of one or more instructions that were part of a mis-speculation in execution (e.g., due to a branch misprediction).

In contrast to the other architectural registers, free list circuit 232 and history file circuit 234 are not used in conjunction with mappings of the status register to physical registers. Instead, the count values from the allocation counter 205 and the retirement counter 206 replace the functions that would be otherwise provided by the free list circuit 232 and history file circuit 234 with respect to the status register and the subset 221 of physical registers reserved thereto.

Both allocation counter 205 and retire counter 206 are configured to count up to the same maximum value. This maximum value may correspond to the number of physical registers in subset 221. The count values output by allocation counter 205 and retirement counter 206 may act as pointers that provide a snapshot of the available physical registers of subset 221, along with a history that may allow reverting the state of the status register back to the retire point in the event of a mis-speculation. When the retire count value trails the allocation count value, the physical registers between these two count values are occupied, having been mapped to the status register for instructions that have updated the same. Additionally, the allocation count value corresponds to a next free physical register of subset 221 that is to be mapped to the status register when an instruction that updates this register is to be executed. Thus, the allocation count value and all other count values outside of the range between the retire count value and the allocation count value correspond to physical registers of subset 221 that are free for mapping to the status register.

Because of this arrangement, there is no need to list the physical registers of subset in free list circuit 232. This is due to the fact that the allocation and retire count values provide a snapshot of which physical register of subset 221 are free, as well as the fact that the next physical register to be mapped to the status register corresponds to the allocation count value (since both the status register and the allocation count can be updated monotonically and deterministically).

Furthermore, the arrangement obviates any need to store a history of use of the physical registers of subset 221 in history file circuit 234. This is due to the fact that, in the event of a mis-speculation that requires a rewind to an earlier point in the instruction stream, the allocation counter can be decremented from its current value back as far as to the value corresponding to the first unretired instruction of the instruction stream or any point therebetween. Thus, the desired state of the status register can be found with a simple decrementing of the allocation counter to the necessary value corresponding to, e.g., a check point. This may allow for fast restoration of the status register state to a non-speculative value so that execution may resume.

By obviating the need to store information regarding the physical registers of subset 221 in either the free list circuit 232 or history file circuit 234, additional benefits may be provided. In particular, both the free list circuit 232 and history file circuit 234 may be made smaller since there is no need to provide any storage circuits (e.g., flop circuits) to accommodate information for the physical registers of subset 221. This can reduce the circuit area required to implement both free list circuit 232 and history file circuit 234. Furthermore, since mapper circuit 210 does not need to search the free list stored in free list circuit 232 to find a free physical register to be mapped to the status register, or write history information to the history file stored in history file circuit 234, additional power savings may be realized.

As previously noted, the example of FIG. 2, while directed to mapping/renaming for a status register, this example is not intended to be limiting. On the contrary, the present disclosure contemplates the mechanisms for mapping/renaming discussed herein as being provided for other architectural registers defined by an instruction set architecture that may be updated in a similar manner.

Examples of Mapping/Renaming Using Allocation and Retire Counters

Figure 3:
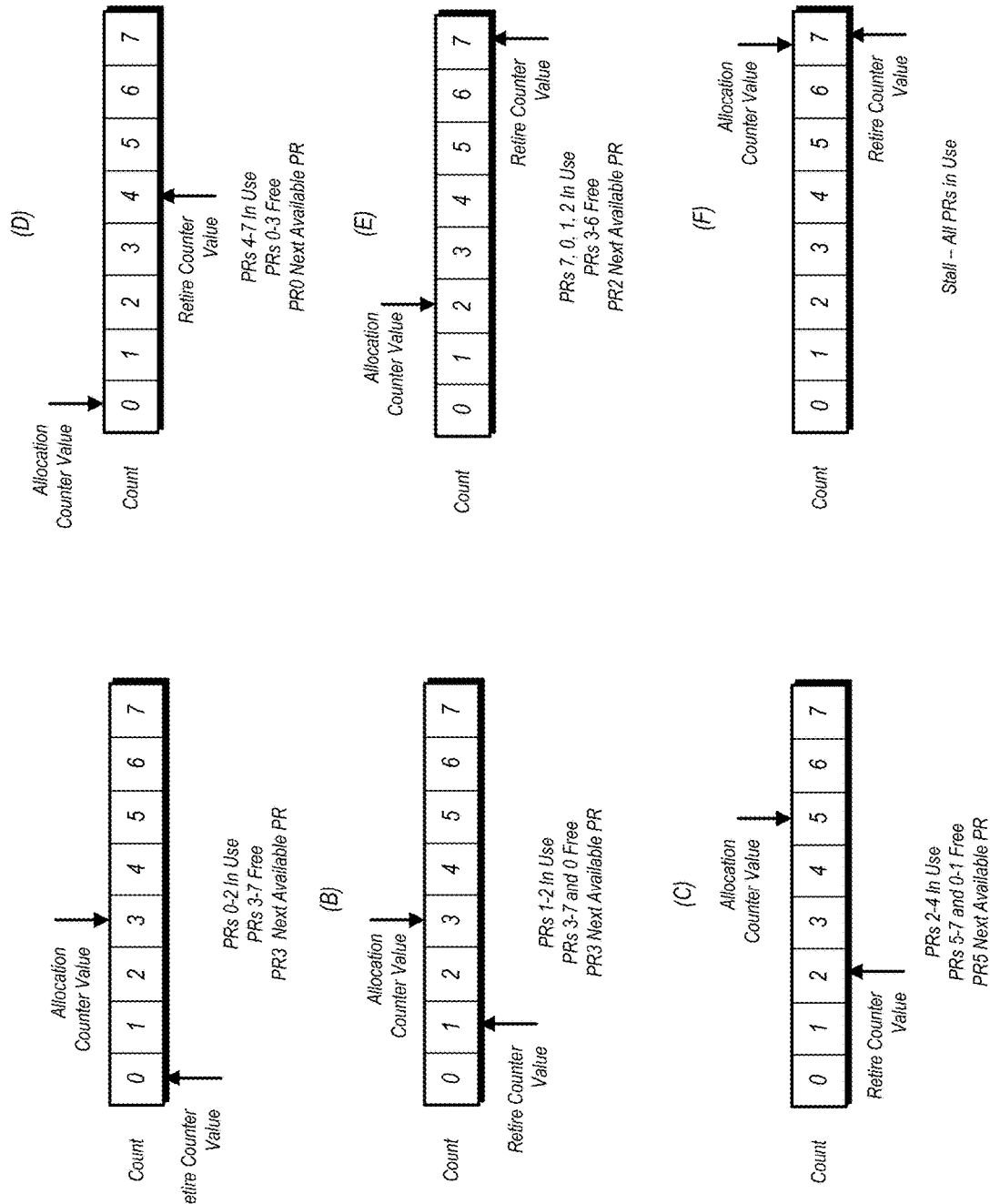
FIG. 3 is a series of diagrams illustrating the operation of determining a next physical register to be mapped to an architectural register.

FIG. 3 is a series of diagrams illustrating the operation of determining a next physical register to be mapped to an architectural register. These examples are simplified to illustrate the concept of using counter values for mapping of physical registers to a particular architectural register, but should not be considered to limit the disclosure to any specific counter size, specific number of physical registers, or any particular architectural register.

The examples shown here are directed to an allocation counter and a retire counter which each have eight unique values, and which wrap around (return to the beginning) after reaching a maximum count value. Generally speaking, subsequent to initialization, the retire count value trails the allocation counter except in the case of a stall, an example of which is provided in FIG. 3.

For the sake of illustration, the examples here are assumed to occur in order from example (A) to example (F), although this is not intended to limit the scope of the disclosure.

In example (A), the allocation count value is 3 and the retire count value of 0. IN this example, physical registers corresponding to count values 0-2 are in use, having been mapped to an architectural register, such as the status register used in the example above. Meanwhile, physical registers corresponding to count values of 3-7 are free and available for use. Since the allocation count has a value of 3, the physical register corresponding to this value will be the next one to be mapped to the architectural register.

In example (B), the allocation count value remains at 3, while the retire count value has incremented to 1. This indicates that the instruction associated with the mapping of the physical register corresponding to count 0 has been retired, and that the next instruction to retire is associated the physical register corresponding to count 1. In this example, the physical registers corresponding to the count values of 1 and 2 are mapped to the architectural register, while the physical registers corresponding to count values of 3-7 and 0 are free, with the register corresponding to the count value of 3 being the next to be mapped.

In example (C), the allocation count value has incremented to a value of 5, while the retire count value has incremented to a value of 2. This means that the instruction associated with the register corresponding to the count value of 1 has retired, causing the incrementing of the retire counter. Additionally, two more instructions updating the architectural register have executed, thereby causing two more physical register to be mapped thereto while incrementing the allocation count to a value of 5. In this example, the physical registers corresponding to the count values of 2, 3, and 4 are mapped to the architectural register, while the physical registers associated with count values of 5-7 and 0-2 are free. The register associate with the count of 5 is the next to be mapped.

In example (D), the allocation count value has incremented and wrapped back to a value of 0, while the retire count value has incremented to 4, indicating the retirement of two additional instructions that updated the architectural register. The physical registers associated with count values of 4-7 are in use, while the physical register associated with count values of 0-3 are free. The physical register associated with a count value of 0 is the next physical register to be mapped to the architectural register.

In example (E), the allocation counter has incremented to a value of 2, while the retire counter value has incremented to a value of 7. This indicates that the instructions that were associated with the physical registers corresponding to count values 4-6 have retired, with the instruction associated with count value 7 being the next to retire. Meanwhile, two additional instructions have executed to update the architectural register, causing the allocation counter to increment from 0 to 2. Thus, the physical registers in use are associated with the count values of 7, 0, and 1, while registers associated with count values of 2-6 being free. The physical register associated with the count value of 2 is the next to be mapped to the architectural register.

Example (F) is an example of a situation in which a stall may occur. In this example, the allocation count has been incremented up to a value of 7, while the retire counter has not incremented further. Accordingly, there are no free physical registers in this example, and no further instructions updating the architectural register can be executed until the retirement of one or more previously executed instructions that also updated that register. It is noted however, that this situation may be rare or may be eliminated altogether if the number of physical registers is large enough and/or the number of instructions in a re-order buffer group is limited to a certain value.

In some embodiments, instructions may be issued and executed in reorder buffer groups, which refer to groups of instructions in a same instruction sequence corresponding to entries in a reorder buffer. The reorder buffer may be used to manage the processing of instructions in processors that utilize out-of-order execution, and may ensure that the results of the instructions are committed to architectural registers in their original sequence. In processors where instructions are issued as reorder buffer groups, providing a number of physical registers that is greater than the number of instruction in a reorder buffer group may prevent a stall such as that which is illustrated here. Accordingly, the disclosure contemplates the issuance of instructions in reorder buffer groups. The disclosure further contemplates causing the retire counter to increment by a number of instructions in a reorder buffer group that updated the architectural register in response to the retirement of those instructions.

Figure 4:
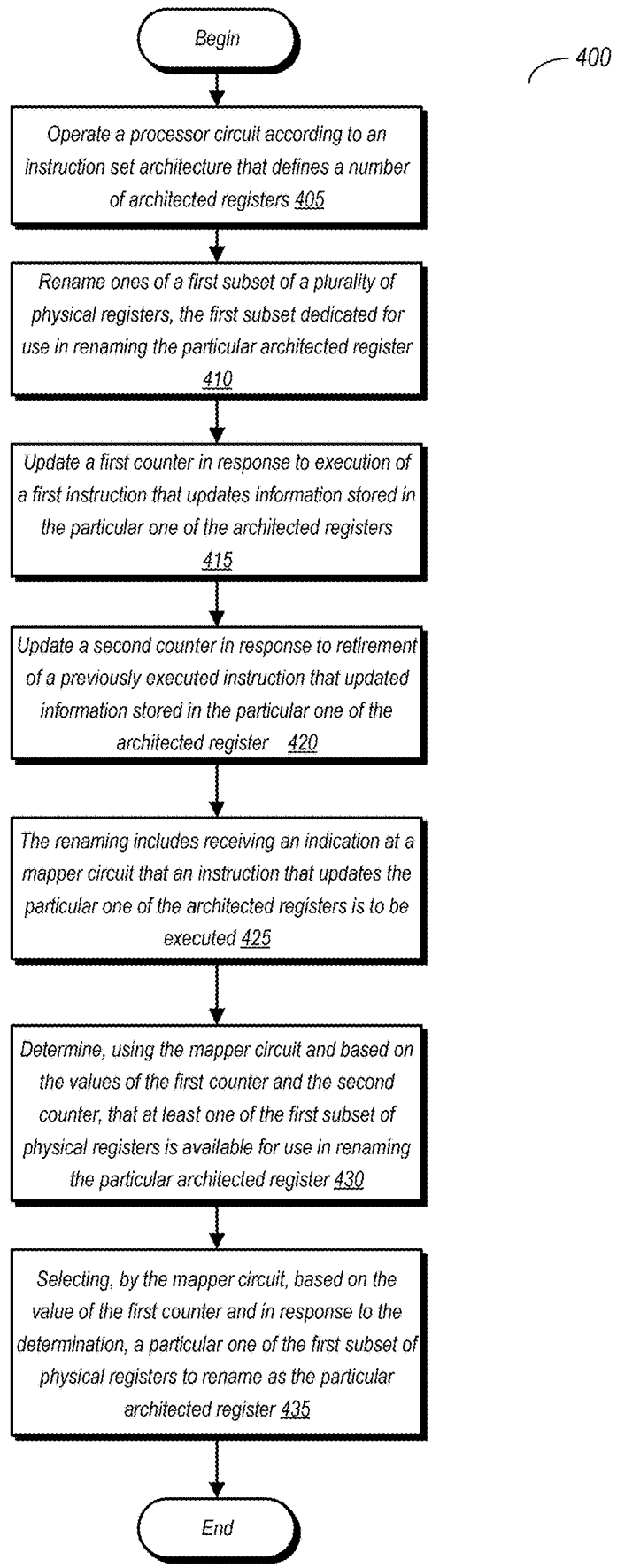
FIG. 4 is a flow diagram illustrating one embodiment of a method for carrying out register renaming for a deterministically updated architectural register.

Methods of Operation:

FIG. 4 is a flow diagram of one embodiment of a method for operating a processor in accordance with the disclosure. The Method 400 may be carried out by any hardware embodiment disclosed herein. Furthermore, hardware embodiments capable of carrying out Method 400, but not otherwise disclosed herein, are also considered to fall within the scope of this disclosure.

Method 400 includes operating a processor circuit according to an instruction set architecture that defines a number of architectural registers (block 405). The method further includes renaming ones of a first subset of a plurality of physical registers dedicated for use in renaming the particular one of the architectural registers (block 410). In various embodiments, the renaming includes updating a first count value from a first counter in response to execution of a first instruction that updates information stored in the particular one of the architectural registers (block 415), and updating second count value from a second counter in response to retirement of a previously executed instruction that updated information stored in the particular one of the architectural registers (block 420). The renaming further includes receiving an indication, at a mapper circuit, that an instruction that updates the particular one of the architectural registers is to be executed (block 425), making a determination, using the mapper circuit and based on the first and second count values, that at least one of the first subset of physical registers is available for use in renaming the particular architectural register (block 430), and selecting, by the mapper circuit, based on the first count value and in response to the determination, a particular one of the first subset of physical registers to rename as the particular architectural register (block 435).

In various embodiments, wherein the first count value indicates a next free physical register to be renamed as the architectural register. In some embodiments, the particular architectural register is a status register that stores a plurality of flag bits. However, the method contemplates the renaming/mapping disclosed herein being carried out with respect to other architectural registers.

In various embodiments, the method includes decrementing the first counter, by a reorder buffer circuit, in response to a mis-speculation comprising execution of an instruction that caused incrementing of the first counter. Such embodiments may also include storing, in the reorder buffer, a value indicative of a number of instructions having the particular architectural register as a destination architectural register in a reorder buffer group.

Figure 5:
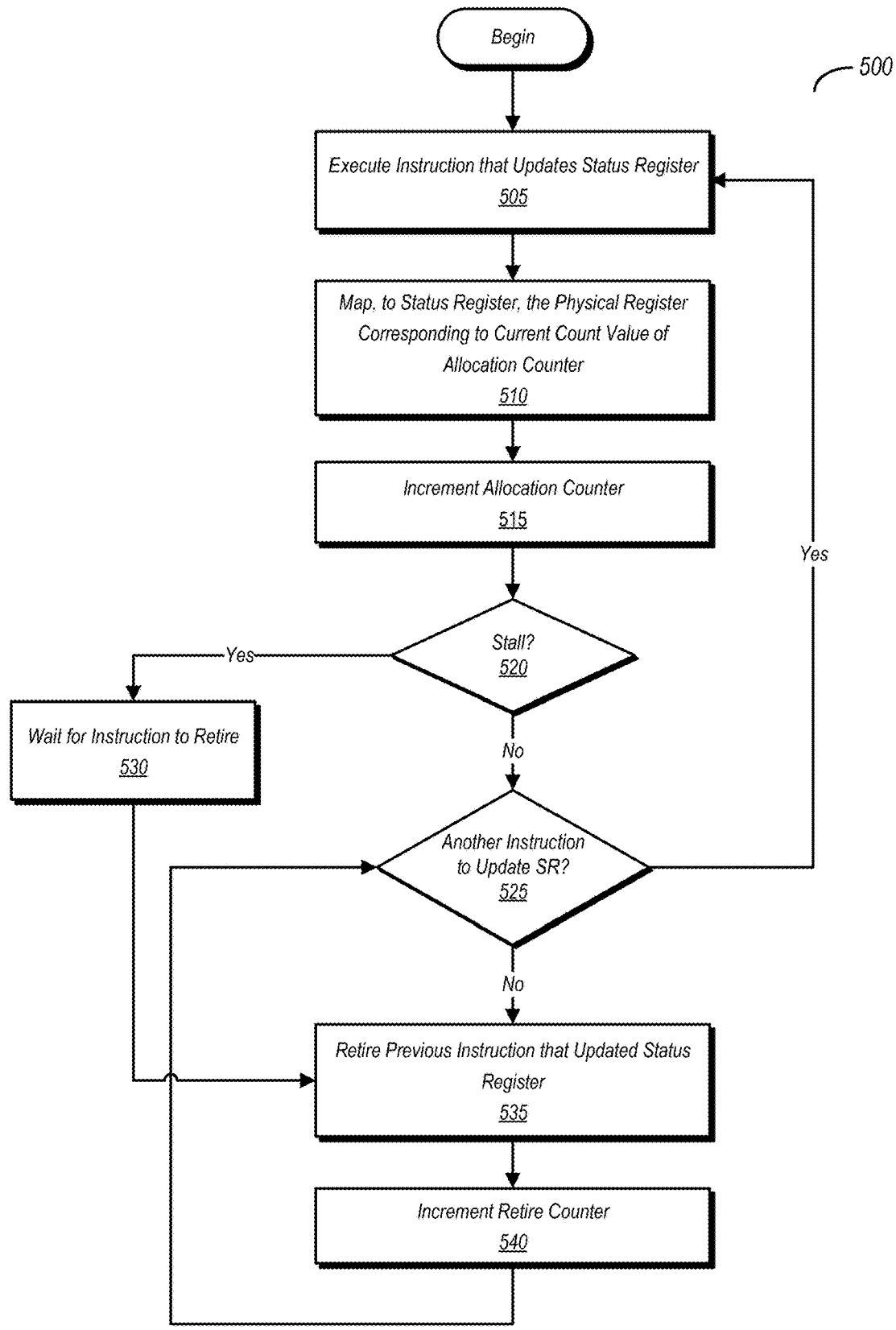
FIG. 5 is a flow diagram illustrating another embodiment of a method for carrying out register renaming for a deterministically updated architectural register.

FIG. 5 is a block diagram of one embodiment for carrying out renaming physical registers by mapping them to a status register. Method 500 may be carried out by various embodiments of the hardware discussed herein. While the method is directed to mapping physical registers to an architectural status register, it is noted that the disclosure contemplates performing similar operations with respect to other architectural registers.

Method 500 includes executing an instruction that updates the status register (block 505). The method further includes mapping, to the status register, a physical register that corresponds to a count value of an allocation counter (block 510). As used herein, renaming the physical register refers to mapping that physical register to a particular architectural register, such as the status register referred to in this embodiment. The physical register may be part of a subset of physical registers that is reserved for exclusive use for mapping to the architectural register. After the mapping has been performed, the method further includes incrementing the allocation counter (block 515).

In some hardware embodiments, a stall may occur if the allocation counter catches up with a retirement counter that is incremented when instructions that updated the architectural register are retired. When this happens, further instructions that update the architectural register cannot occur until one or more previous instructions that did the same are retired. Thus, if a stall occurs (block 520, yes), the processor may wait for one or more of these instructions to retire (block 530), thereby freeing one or more corresponding physical registers. When an instruction that previously updated the architectural register is retired (block 535), the retired counter is incremented (block 540).

If no stall occurs after the most recent incrementing of the allocation counter (block 520, no), and there is another instruction to be executed that also updates the architectural register (block 525, yes), Method 500 returns to block 505. Otherwise, an instruction that previously updated the architectural register is retired (block 535), and the retire counter is incremented (block 540). After incrementing the retire counter, the method returns to block 525, and proceeds to either block 535 when no instructions that update the architectural register are pending (block 525, no), or back to block 505 when execution of at least one additional instruction that updates the architectural register is bending (block 525, yes).

Figure 6:
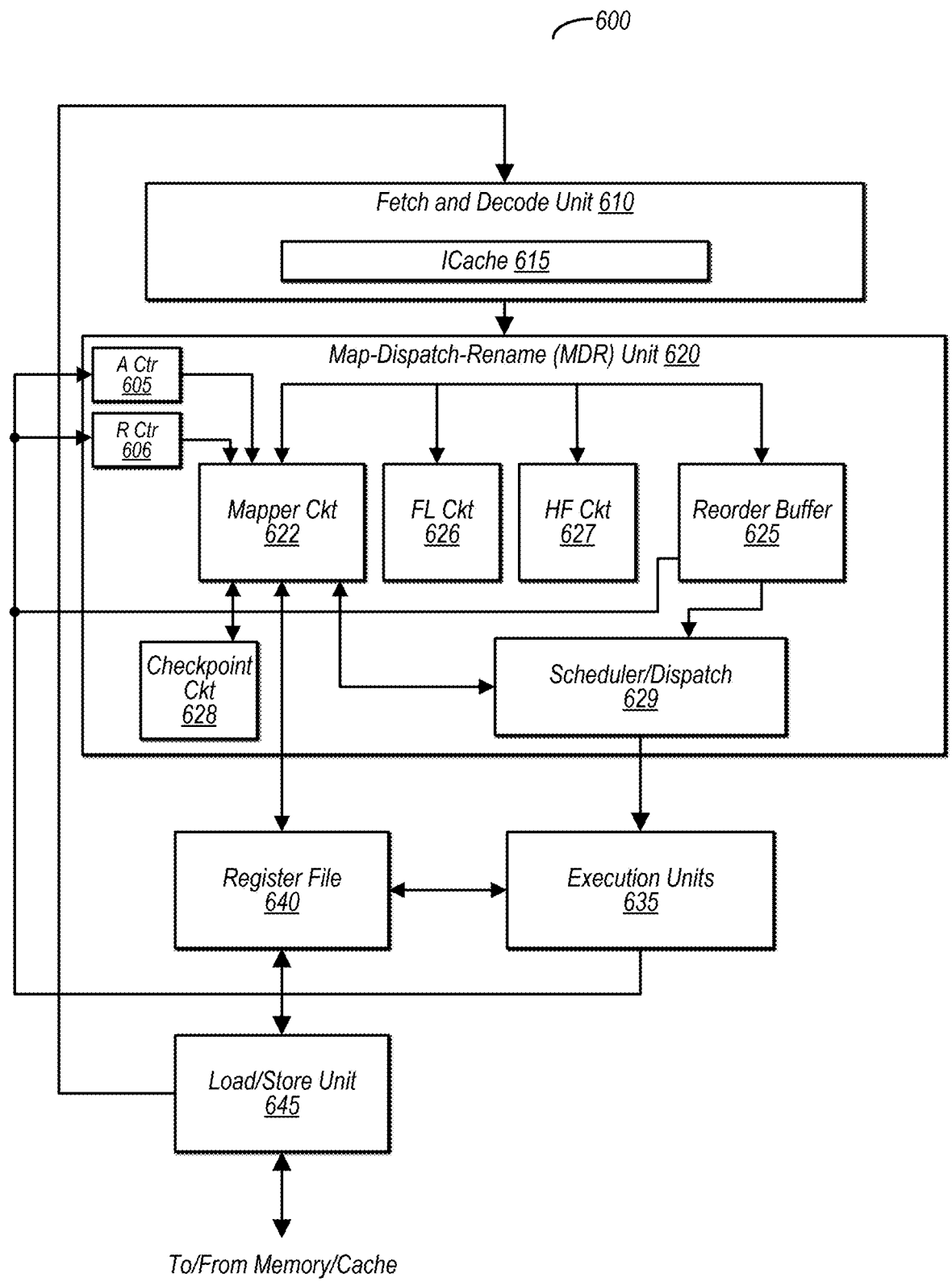
FIG. 6 is a block diagram of one embodiment of a processor circuit.

Processor Block Diagram:

FIG. 6 is a block diagram of one embodiment of a processor pipeline in which the register mapping/renaming of the present disclosure may be carried out. In the embodiment shown, processor pipeline 600 includes a fetch and decode unit 410 (which includes an instruction cache 615), a map-dispatch-rename (MDR) circuit 620, a register file 640, execution units 635, and a load/store unit 645. MDR circuit 620 in the embodiment shown includes and allocation counter 605, a retire counter 606, a mapper circuit 622, a free list circuit 626, a history file circuit 627, a reorder buffer circuit 625, a checkpoint circuit 628, and a scheduler/dispatch circuit 629.

Fetch and decode unit 610 in the embodiment shown includes circuitry used to fetch instructions from a memory or a cache for subsequent execution. In various embodiments, fetch and decode unit 610 includes one or more prefetchers configured to speculatively fetch instructions, but may also carry out non-speculative fetches. Some fetched instructions, such as those that are frequently used, may be stored in instruction cache 615 subsequent to being fetched from memory. Fetch and decode unit 615 may also include decode circuitry configured to decode fetched instructions. The decoding of an instruction may include determining the operation(s) to be carried out, source and destination registers (architectural) to be used in execution of the instruction, and other information, such as indications of a conditional branch.

Mapper circuit 622 of MDR unit 620 may carry out register renaming operations per the disclosure. In particular, mapper circuit 622 may map certain physical registers in register file 640 to architectural registers that are used as a source and/or a destination by various instructions to be executed. In determining which physical registers to use, mapper circuit 622 may access a free list stored in free list circuit 626 to determine availability of the various physical registers. Mapper circuit 627 may also place information corresponding to physical registers used in executed instructions into history file 627, where the information may remain until the corresponding instructions and any dependent instructions have been retired.

MDR unit 620 also includes an allocation counter circuit 605 and a retire counter circuit 606. These counters are used in mapping a given architectural register (such as the status register) to physical registers that comprise a dedicated subset of the physical registers in register file 640. As described in reference to FIGS. 1-3, the use of the respective count values output by allocation counter circuit 605 and retire counter circuit 606 may obviate the need to utilize the free list circuit 626 and the history file circuit 627, as the two count values provide a snapshot of both the availability of physical registers in the subset as well as the history of physical registers mapped to the architectural register for instructions that have not been retired.

Reorder buffer circuit 625 may group instructions into reorder buffer groups, and may also perform reordering of instructions to enable out-of-order execution when permitted. For example, an instruction that is a last instruction of a particular reorder buffer group, but has no dependency on any other instruction in the group, may be reordered to execute first. The enabling of out-of-order execution may allow more efficient use of processor pipeline 600 by helping to keep pipeline stages full. Reorder buffer circuit 625 may also ensure that results of instructions of a particular reorder buffer group are committed to architectural registers and those instructions retired in the intended program order. In some embodiments, when a mis-speculation occurs, reorder buffer circuit 625 may decrement allocation counter 605 back to a value corresponding to a previous checkpoint to enable restoring of a processor state that existed prior to the mis-speculation. Reorder buffer circuit 625 may also increment the retire counter 606 when instructions in a particular reorder buffer group is retired. When a particular number of instructions within a reorder buffer group are retired, reorder buffer 625 may increment retire counter 606 by that particular number. Reorder buffer circuit 625 may also store a value that indicates a number of instructions within a particular reorder buffer group that use the given architectural register (such as the status register) as a source or a destination.

Checkpoint circuit 628 in the embodiment shown may keep track of processor states at various checkpoints to enable rewinds due to mis-speculations. For example, is a branch misprediction occurs with several instructions executed after the branch, checkpoint circuit may allow the recovery of the processor state back to the last retired instruction prior to the branch instruction. In saving the processor state, checkpoint circuit 628 may save information regarding mappings of physical registers to architectural registers. This may include saving the count value from the allocation counter circuit 605 to enable recovery of the state of the particular architectural register associated with this counter.

Scheduler/dispatch circuit 629 may schedule instructions for execution, and may also dispatch instructions to the execution units 635. In scheduling instructions for execution, scheduler/dispatch circuit 629 may receive information, from reorder buffer circuit 625, indicative of the actual order in which instructions are to be executed within a particular reorder buffer group. Furthermore, scheduler/dispatch circuit 629 may also provide information regarding scheduled instructions to mapper circuit 622 in order to enable physical registers of register 640 to be scheduled for renaming as architectural registers associated with the instructions. Mapper circuit 622 may provide information corresponding to renamed physical registers back to scheduler/dispatch circuit 622 in order to enable execution circuits in execution units 635 to find any required source data as well as find destination registers in which to write results.

Execution units 635 may comprise various execution circuits that execute instructions received from scheduler/dispatch circuit 629. The various types of execution circuits may include one or more integer value execution circuits, one or more fixed point execution circuits, and one or more floating point execution circuits. Other types of execution circuits are also possible and contemplated. In executing instructions, the various execution circuits may access register file 640 to obtain any required source data/operands there from, using information regarding renamed registers originally generated by mapper circuit 622. The various execution circuits may also write results of executed instructions to physical registers designated as destination registers per the register renaming carried out by mapper circuit 622.

Load/store unit 645 in the embodiment shown comprises at least one additional execution circuit that is specialized for memory accesses. These operations include carrying out loads, in which instructions and/or data is loaded from another storage in a memory hierarchy that may include multiple levels of cache memory, a main system memory, and bulk storage. Stores carried out by load/store unit 645 may store information back to main system memory, and may also include storing the data to one or more levels of cache memory, as well as to bulk storage.

Example Device

Figure 7:
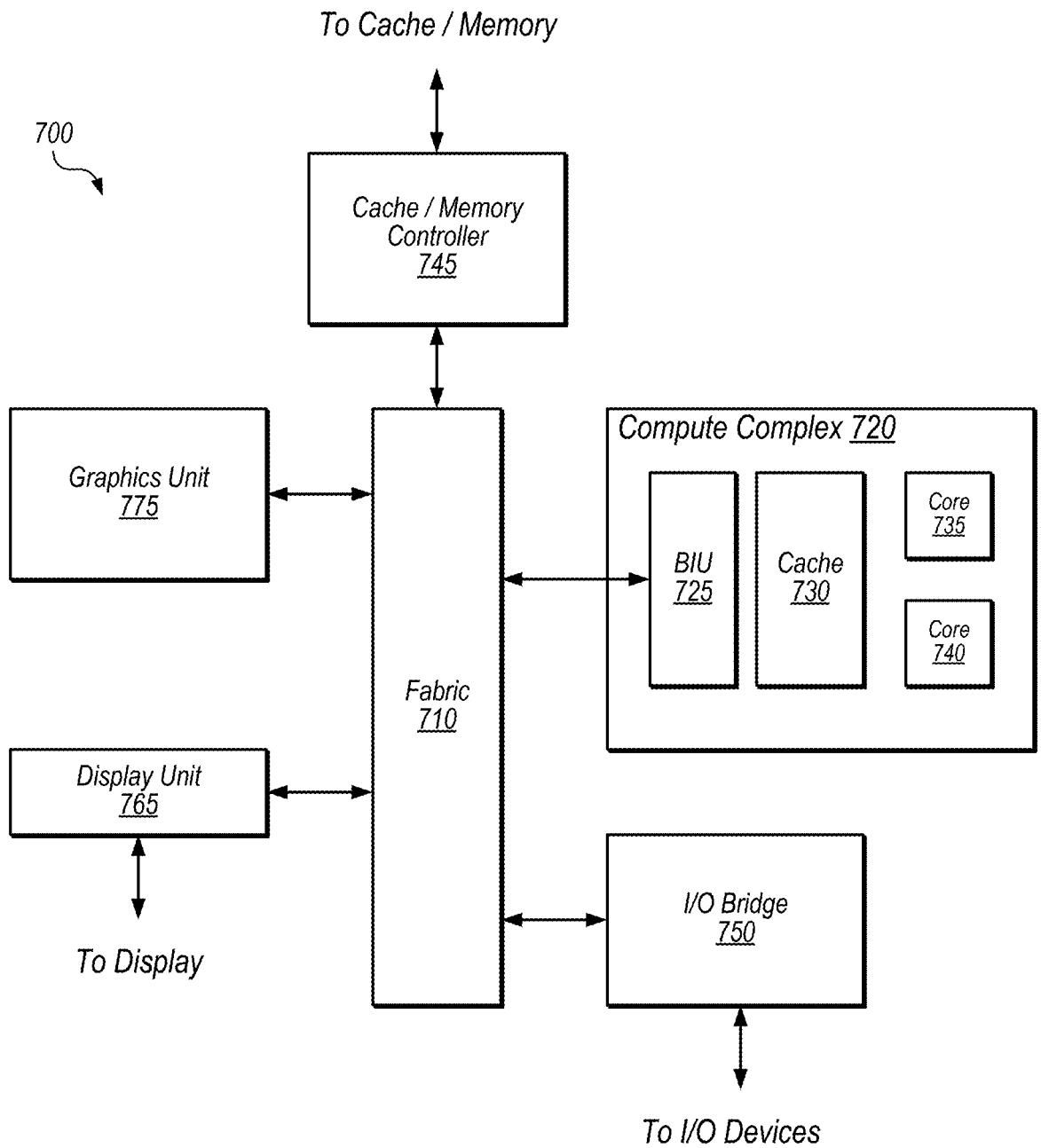
FIG. 7 is a block diagram of one embodiment of an example device.

Referring now to FIG. 7, a block diagram illustrating an example embodiment of a device 700 is shown. Device 700 in the embodiment shown may be a system-on-a-chip implemented on a single integrated circuit, or some number of integrated circuits connected to one another, with each integrated circuit implementing a portion of the functionality shown here. In some embodiments device 700 may include a processor that carries out register renaming/mapping as discussed above with reference to FIGS. 1-6.

In some embodiments, elements of device 700 may be included within an SoC. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally. In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications

Figure 8:
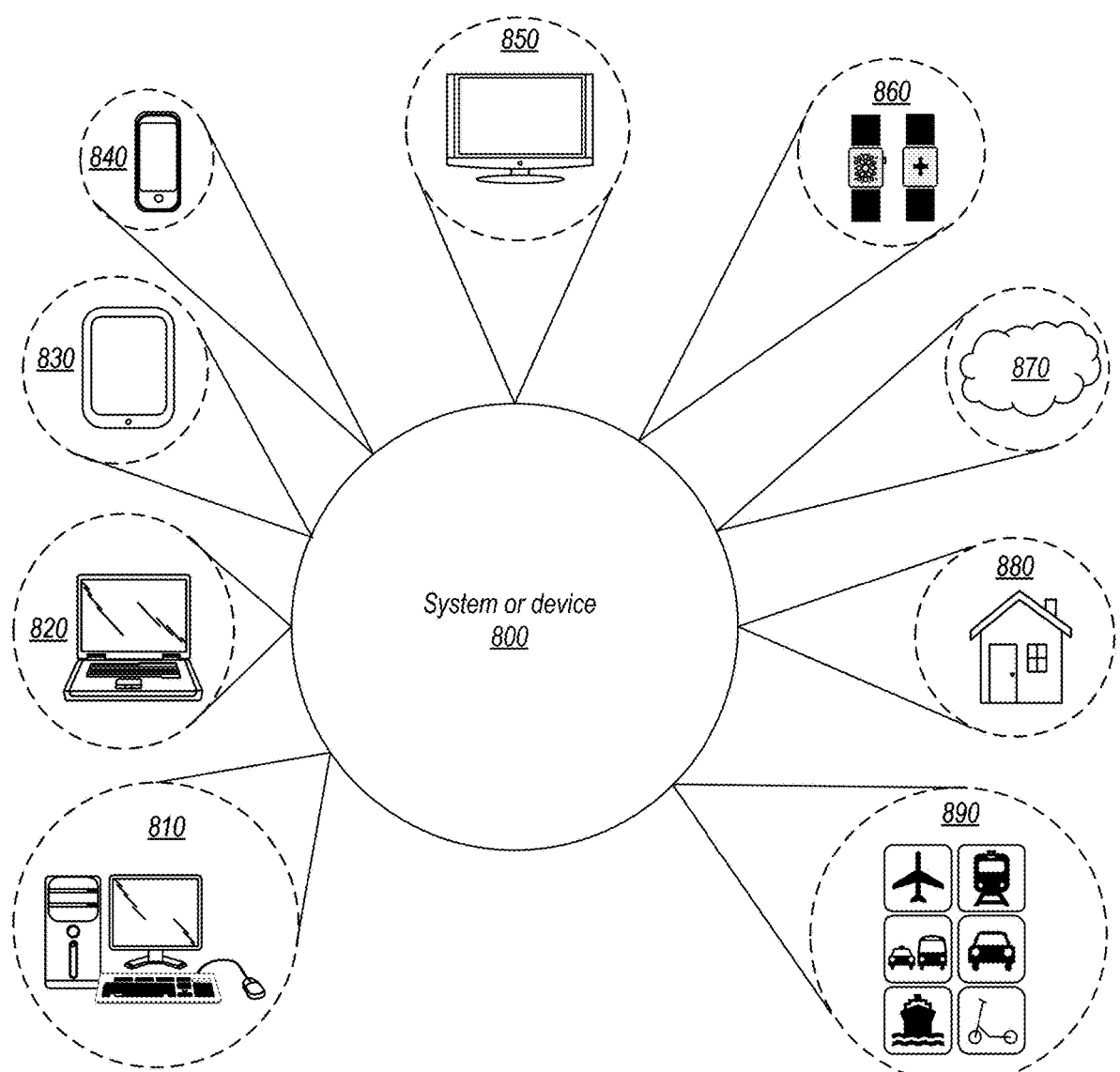
FIG. 8 is a diagram illustrating example applications of the processor circuit of the present disclosure.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc. In various embodiments, any of the example application illustrated in FIG. 8 may include a processing circuit that implements register renaming in accordance with the disclosure and discussed above in reference to FIGS. 1-6.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
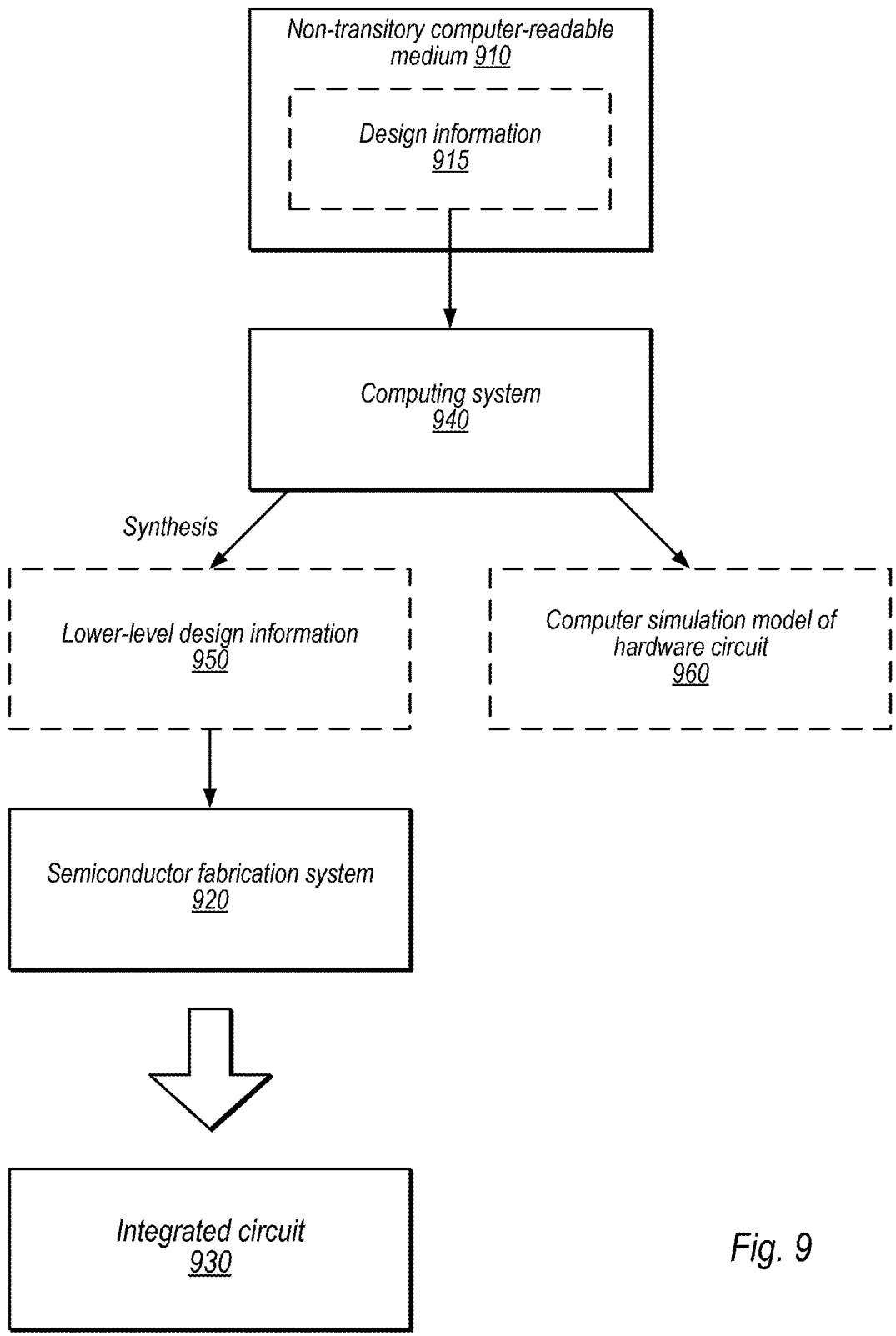
FIG. 9 is a diagram illustrating one embodiment of a non-transitory computer readable medium usable to manufacture a processing circuit according to the disclosure.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in or discussed in reference to FIGS. 1-6. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a processor circuit configured to operate according to an instruction set architecture, wherein the instruction set architecture defines a plurality of architectural registers, wherein the processor circuit includes:
a register file circuit having a plurality of physical registers including a first subset of physical registers dedicated for use in renaming a particular architectural register;
a first counter configured to update, in response to execution of an instruction that updates the particular architectural register, a first count value identifying one of the first subset of physical registers;
a second counter configured to update, in response to retirement of a previously executed instruction that updated the particular architectural register, a second count value identifying another one of the first subset of physical registers; and
a mapper circuit configured to:
receive an indication that an instruction that updates the particular architectural register is to be executed;
make a determination, based on values of the first counter and the second counter, that at least one of the first subset of physical registers is available for use in renaming the particular architectural register;
in response to the determination, select, based on a value of the first counter, a particular one of the first subset of physical registers to be mapped to the particular architectural register.

2. The apparatus of claim 1, wherein the mapper circuit is configured to map, to the particular architectural register, a next free physical register that is indicated by the first count value, wherein renaming the next free physical register comprises mapping the next free physical register to the particular architectural register.

3. The apparatus of claim 1, wherein the particular one of the architectural registers is a status register configured to store a plurality of flag bits.

4. The apparatus of claim 1, further comprising a history file configured to store information corresponding to ones of a second subset of the plurality of physical registers that have been mapped to architectural registers, wherein the second subset of physical registers excludes physical registers of the first subset of physical registers.

5. The apparatus of claim 1, further comprising a free list configured to indicate which of a second subset of physical registers are free for mapping to architectural registers, wherein the second subset of physical registers excludes physical registers of the first subset of physical registers.

6. The apparatus of claim 1, further comprising a reorder buffer circuit configured to decrement the first count value in response to a mis-speculation comprising execution of an instruction that caused incrementing of the first counter.

7. The apparatus of claim 6, wherein, in response to the mis-speculation, the reorder buffer circuit is configured to decrement the first count value back to a value corresponding to a check point.

8. The apparatus of claim 7, wherein the reorder buffer circuit is further configured to store a value indicative of a number of instructions having the particular architectural register as a destination architectural register in a reorder buffer group.

9. The apparatus of claim 8, wherein, in response to retirement of the number of instructions having the particular architectural register as the destination architectural register, the reorder buffer circuit is configured to cause the second counter to increment by the number.

10. The apparatus of claim 1, further comprising a checkpoint circuit configured to periodically save a processor state, wherein the processor state for the particular one of the architectural registers is indicated by a count value from the first counter.

11. A method comprising:
 operating a processor circuit according to an instruction set architecture that defines a number of architectural registers;
 mapping ones of a first subset of a plurality of physical registers dedicated for use in mapping to a particular one of the architectural registers, wherein mapping physical registers of the first subset includes:
  updating a first count value from a first counter in response to execution of a first instruction that updates information stored in the particular one of the architectural registers;
  updating second count value from a second counter in response to retirement of a previously executed instruction that updated information stored in the particular one of the architectural registers;
  receiving an indication, at a mapper circuit, that an instruction that updates the particular one of the architectural registers is to be executed;
  making a determination, using the mapper circuit and based on the first and second count values, that at least one of the first subset of physical registers is available for use in mapping to the particular architectural register;
  selecting, by the mapper circuit, based on the first count value and in response to the determination, a particular one of the first subset of physical registers to be mapped to the particular architectural register.

12. The method of claim 11, wherein the first count value indicates a next free physical register to be renamed as the particular architectural register.

13. The method of claim 11, wherein the particular architectural register is a status register that stores a plurality of flag bits.

14. The method of claim 11, further comprising decrementing the first counter, by a reorder buffer circuit, in response to a mis-speculation comprising execution of an instruction that caused incrementing of the first counter.

15. The method of claim 14, further comprising storing, in the reorder buffer circuit, a value indicative of a number of instructions having the particular architectural register as a destination architectural register in a reorder buffer group.

16. The method of claim 15, further comprising incrementing, by the reorder buffer circuit, the second counter by the number of instructions in response to retirement of the instructions indicated by the value.

17. The method of claim 11, further comprising periodically saving a processor state, by a checkpoint circuit, wherein the processor state for the particular one of the architectural registers is indicated by a count value from the first counter.

18. A system comprising:
 a processor circuit, wherein the processor circuit is configured to carry out operations in accordance with an instruction set architecture, wherein the instruction set architecture defines a plurality of architectural registers including a status register, and wherein the processor circuit includes:
  a register file circuit having a plurality of physical registers, wherein physical registers of a subset are dedicated to use in mapping to the status register;
  an allocation counter configured to increment in response to execution of an instruction that updated the status register, wherein a count value of the allocation counter indicates a next physical register of the subset to which the status register is to be mapped;
  a retire counter configured to increment in response to retirement of a previously executed instruction that updated the status register, wherein a count value of the retire counter indicates a physical register for a most recently retired instruction that updated the status register; and
  a mapper circuit configured to receive an indication of an instruction to be executed that updates the status register and is further configured to determine that at least one physical register of the subset is free for mapping to the status register based on count values of the allocation counter and the retire counter.

19. The system of claim 18, further comprising:
 a checkpoint circuit configured to periodically save a processor state, wherein the processor state for the status register is indicated by a count values from the allocation counter; and
 a reorder buffer configured to decrement the allocation counter back to a value indicative of a checkpoint corresponding to the processor state most recently saved by the checkpoint circuit and in response to a mis-speculation that comprised execution of at least one instruction that updated the status register.

20. The system of claim 19, wherein the reorder buffer is further configured to cause the retire counter to increment by a value corresponding to a number of instructions in a reorder buffer group in response to retirement of instructions in the reorder buffer group that updated that status register.

* * * * *